United States Patent
Tolstoy et al.

(10) Patent No.: US 9,806,984 B1
(45) Date of Patent: Oct. 31, 2017

(54) SEPARATING NETWORK TRAFFIC AMONG VIRTUAL SERVERS

(71) Applicant: EMC Corporation, Hopkinton, MA (US)

(72) Inventors: Vasiliy Tolstoy, St. Petersburg (RU); Arthur Otis Harris, Framingham, MA (US); Mukesh Gupta, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 14/985,656

(22) Filed: Dec. 31, 2015

(51) Int. Cl.
*H04W 72/06* (2009.01)
*H04L 12/755* (2013.01)
*H04L 12/713* (2013.01)
*H04L 12/721* (2013.01)
*H04L 12/741* (2013.01)

(52) U.S. Cl.
CPC .......... *H04L 45/021* (2013.01); *H04L 45/586* (2013.01); *H04L 45/72* (2013.01); *H04L 45/745* (2013.01)

(58) Field of Classification Search
None
See application file for complete search history.

(56) References Cited

U.S. PATENT DOCUMENTS

| 7,512,744 | B2 * | 3/2009 | Banga ................. H04L 29/06 709/214 |
| 7,949,785 | B2 | 5/2011 | Alkhatib et al. |
| 8,867,349 | B2 | 10/2014 | Martini et al. |
| 8,874,749 | B1 | 10/2014 | Vittal et al. |
| 8,910,273 | B1 | 12/2014 | Fausak et al. |
| 9,197,543 | B2 | 11/2015 | Brendel et al. |
| 9,258,271 | B1 | 2/2016 | Anderson |
| 9,311,133 | B1 | 4/2016 | Nataraja et al. |
| 9,313,044 | B2 | 4/2016 | Tsai et al. |

* cited by examiner

*Primary Examiner* — Vinncelas Louis
(74) *Attorney, Agent, or Firm* — BainwoodHuang

(57) ABSTRACT

Techniques for routing network traffic in a storage processor involve providing per-IP routing tables for each IP address of a virtual server and a per-server routing table. These per-IP and per-server routing tables specify its own interface(s) with external network(s). The storage processor assigns each outbound protocol data unit (PDU), generated by a particular virtual server, to either a per-IP routing table or a per-server routing table provided for that virtual server. The assignment of the routing table is based on source IP address or a connection mark associated with an outbound PDU. The per-IP or per-server routing table(s) identifies an interface through which the packet is routed to the destination IP address.

20 Claims, 4 Drawing Sheets

SEPARATING NETWORK TRAFFIC AMONG VIRTUAL SERVERS

BACKGROUND

Data storage systems are arrangements of hardware and software that include storage processors coupled to arrays of non-volatile storage devices. In typical operation, storage processors service storage requests that arrive from a client. The storage processors run software that manages incoming storage requests and performs various data processing tasks to organize and secure the data stored on the non-volatile storage devices.

Some data storage systems have multiple IP addresses through which they serve multiple clients. When a storage processor receives a transmission from a client, the storage processor internally directs the transmission to the IP address specified in the transmission. Also, the storage processor may direct a reply to the same client at the client's IP address, which was specified in the transmission that the storage processor received from the client. The storage processor may look up routing information for locating the client from a routing table maintained in the storage processor's network stack. The information in the routing table includes an address of a gateway, which may reside in a local subnet to which a port of the storage processor is connected and which provides an interface to an additional network, such as a WAN or the Internet.

SUMMARY

Unfortunately, there are deficiencies with the above-described manner in which multiple clients are served. In some situations, for security and privacy reasons, there is a need to separate network traffic of one client from network traffic of other clients on the same SP. Typically, IP addresses accessed by the clients on the SP are assigned to different virtual servers such that each client interacts with its own respective virtual server. However, the SP may contain only a single network stack (i.e., network namespace) for all virtual servers. Thus, in a typical arrangement, different virtual servers running on the SP all share a common routing table, i.e., the routing table of the network namespace. Using this arrangement, network traffic from different virtual servers is routed according to the common SP-specific settings, rather than according to virtual-server-specific settings. Consequently, the virtual servers lack their own respective routing information, and all outgoing/incoming traffic from the SP is treated the same way. For example, one virtual server might preferably connect to one gateway through one port and another virtual server decides to connect to another gateway through another port, however, these distinctions are all erased since the SP has only one routing table that treats all virtual servers the same. Moreover, this common treatment of traffic from different virtual servers may introduce security risks, as transmissions directed to the client of one virtual server may be sent through network components (e.g., IP addresses, network ports and gateways) used by another virtual server and vice-versa, causing leakage of traffic among different virtual servers.

One solution to this deficiency is to provide a separate network namespace for each virtual server. Unfortunately, such a solution is not an option for some legacy systems, which do not support multiple network namespaces.

In contrast with the above-described conventional approach, improved techniques for routing network traffic in a storage processor involve providing each IP address of a virtual server with its own per-IP routing table specifying its own interface with a respective external network. The storage processor assigns each outbound protocol data unit (PDU) generated for use by a particular virtual server to a per-IP routing table provided for that virtual server. The storage processor identifies a per-IP routing table for a PDU based on the IP address of a virtual server internal to the storage processor from which the PDU is originated and which is provided in the PDU. For example, when an outbound TCP packet is generated for a particular virtual server, the storage processor identifies the source IP address of the packet and assigns the packet to a per-IP routing table based on the source IP address. The per-IP routing table identifies an interface through which the packet is routed to the destination IP address.

Advantageously, the improved techniques allow the storage processor to isolate the traffic of virtual servers from each other. Specifically, the interface identified by a per-IP routing table based on a source IP address of an outgoing PDU is the same interface through which incoming PDUs destined to that IP address have been routed. In this way, the storage processor avoids mixing of inbound/outbound PDUs from one virtual server with inbound/outbound PDUs of—another.

One embodiment of the improved techniques is directed to a method of routing network traffic within a server computer. The method includes defining, by processing circuitry of the server computer, (i) multiple virtual servers, each virtual server including a set of IP addresses, (ii) for each of the set of IP addresses of each virtual server, a per-IP routing table identified by that IP address, the Per-IP routing table for that IP address specifying a respective interface of the server computer, and (iii) for each of the virtual servers, a per-server routing table specifying interface(s) as specified by per-IP routing table(s) of that virtual server. The method also includes generating, by the processing circuitry, an outbound protocol data unit (PDU) from a particular virtual server. The method further includes selecting, by the processing circuitry for use by the outbound PDU, one of a per-IP routing table for the particular virtual server or the per-server routing table for the particular virtual server. The method further includes transmitting to the client, by the processing circuitry, the outbound PDU via the interface specified by the selected routing table of the particular virtual server, thus isolating the outbound PDU from other virtual servers.

Additionally, some embodiments are directed to an electronic apparatus constructed and arranged to route network traffic within a server computer. The electronic apparatus includes memory and controlling circuitry coupled to the memory. The controlling circuitry is constructed and arranged to routing network traffic within a server computer.

Further, some embodiments are directed to a computer program product having a non-transitory, computer-readable storage medium that stores executable code, which, when executed by a computer, causes the computer to perform a method of routing network traffic within a server computer.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques for routing network traffic in a storage processor involve providing each IP address of a virtual server with its own per-IP routing table specifying its own interface with a respective external network. The storage processor assigns each outbound PDU generated for use by a particular virtual server to a per-IP routing table provided for that virtual server. The storage processor identifies a per-IP routing table for a PDU based on the IP address of a virtual server in the storage processor from which the PDU is originated and which is provided in the PDU. Advantageously, the improved techniques allow the storage processor to isolate the virtual servers from each other.

Figure 1:
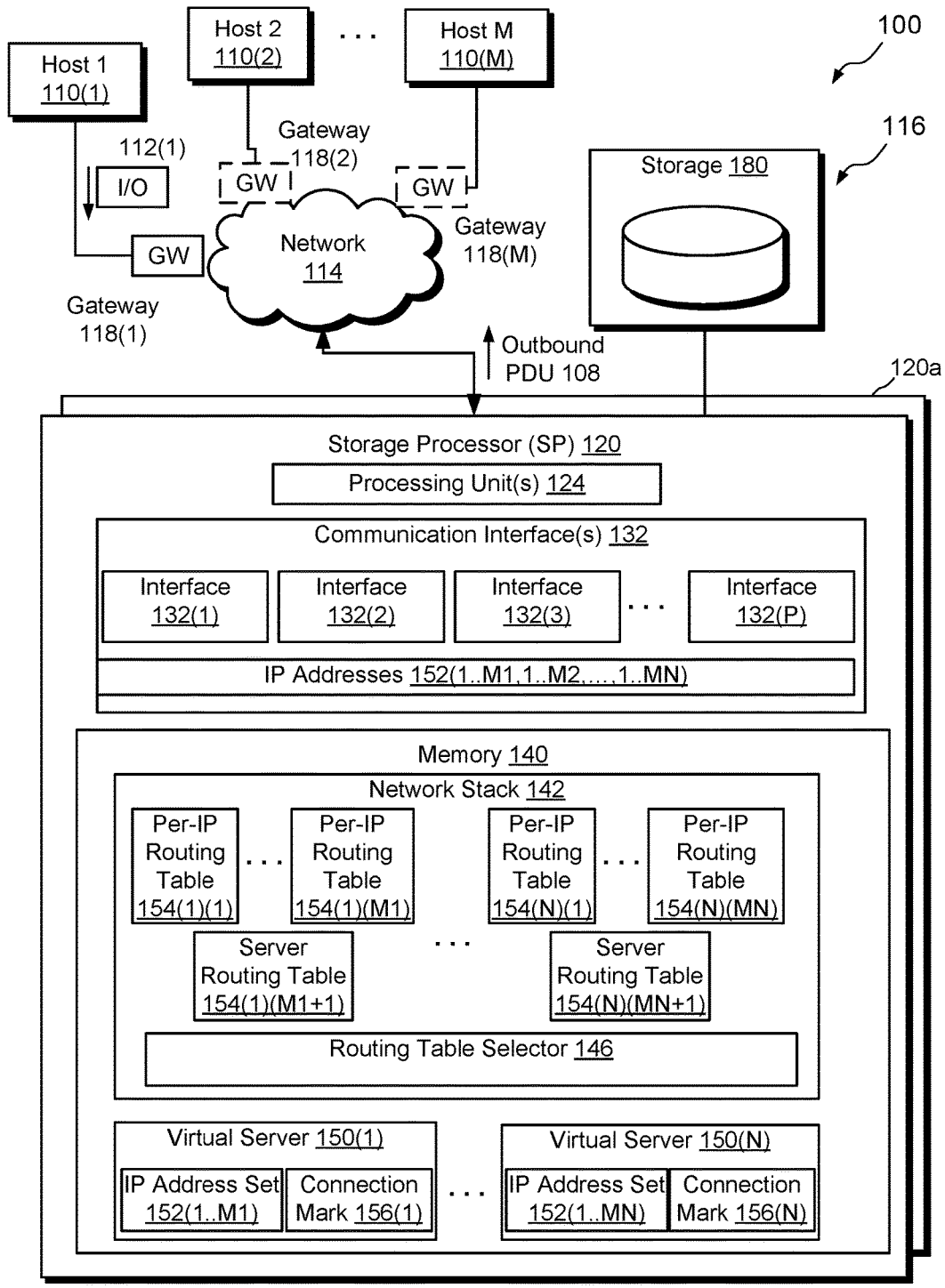
FIG. 1 is a block diagram illustrating an example electronic environment in which the improved technique can be carried out.

FIG. 1 shows an example electronic environment 100 in which embodiments of the improved techniques hereof can be practiced. Here, a host computing device ("host") 110(1) of a client accesses a data storage system 116 over a network 114 at a gateway 118(1). The data storage system 116 includes a storage processor, or "SP," 120 and non-volatile physical storage 180. The physical storage 180 is provided, for example, in the form of magnetic disk drives, optical drives, and/or electronic flash drives, including combinations thereof, such as RAID (Redundant Array of Independent (or Inexpensive) Disks). The data storage system 116 may include multiple SPs. In an example, multiple SPs may be provided in each system as circuit board assemblies, or "blades," which plug into a chassis that encloses and cools the SPs. The chassis in each system has a backplane for interconnecting the SPs, and additional connections may be made among SPs using cables. It is understood, however, that no particular hardware configuration is required, as any number of SPs (including a single one in each system) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the host 110 can connect to the SP 120 using various technologies, such as Fibre Channel (e.g., through a SAN), iSCSI, NFS, SMB 3.0, and CIFS. Any number of hosts 110 may be provided, using any of the above protocols, some subset thereof, or other protocols besides those shown. The SP 120 is configured to receive IO request 112(1) and to respond to such an IO request 112(1) by reading and/or writing the non-volatile storage 180 and sending an acknowledgment, i.e. outbound PDU 108.

The SP 120 is seen to include a set of processing units 124, memory 140, and communication interfaces 132. The set of processing units 124 includes one or more processing chips and/or assemblies. In a particular example, the set of processing units 124 includes numerous multi-core CPUs. The memory 140 includes both volatile memory (e.g., RAM), and non-volatile memory, such as one or more ROMs, disk drives, solid state drives, and the like. The communication interfaces 132 include, for example, SCSI target adapters and network interface adapters, for converting electronic and/or optical signals received from the network 114 to electronic form for use by the SP 120.

The communication interfaces 132 include separate interfaces 132(1), . . . , 132(N) which provide ingress and egress for PDUs to and from the SP 120. Each interface, e.g., 132(1), may be identified with a respective virtual server, e.g., 150(1) of the SP 120 and/or with respective IP address(es) of a host, e.g., 110(1). Further, a gateway, e.g., 118(1) may identify the interface 132(1) indirectly through a series of hop-by-hop routing tables.

The communications interfaces 132 specify various IP addresses 152(1..M1, 1..M2, . . . , 1..MN) of the many virtual servers 150(1..N). Each interface, e.g., 132(1) specifies at least one of these IP addresses. For example, if an inbound PDU specifying a destination IP address arrives at interface that does not specify that address, then the SP 120 may drop that PDU.

The set of processing units 124 and the memory 140 together form control circuitry, which is constructed and arranged to carry out various methods and functions as described herein. Also, the memory 140 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 140 typically includes many other software constructs, which are not shown, such as an operating system, various applications, processes, and daemons, for example.

The memory 140 is seen to include (i.e., realize by operation of programming code) a network stack 142 and virtual servers 150(1), . . . , 150(N). The network stack 142 provides transport services such as TCP/UDP and is configured to act as an intermediary between Communication Interfaces(s) 132 and applications that run on the SP 120. Each virtual server 150(1), . . . , 150(N) is a software construct that is configured to provide network traffic isolation for PDUs between different hosts 110(1 . . . M) communicating with SP 120.

It should be understood that each PDU, inbound to the data storage system 116 or outbound to a host 110(1), . . . , 110(M), specifies a source IP address from which that PDU is sent and a destination IP address to which it is destined. Specifically, the source IP address of an inbound PDU may be a host 110(1), . . . , 110(M) while its destination IP address may be an IP address of one of the virtual servers 150(1), . . . , 150(N). Conversely, an outbound PDU has a source IP address of a virtual server 150(1), . . . 150(N), while the destination IP address may be a host 110(1), . . . , 110(M).

The network stack 142 includes, for each virtual server, e.g., virtual server 150(1), a set of per-IP routing tables 154(1)(1), . . . , 154(1)(M1), where M1 is the number of IP addresses for virtual server 150(1). The network stack 142 also includes, for each virtual server, e.g., virtual server 150(1), a per-server routing table 154(1)(M1+1).

Each of the per-IP routing tables, e.g., 154(1)(1), provides an interface 132(1), . . . , 132(P) to which to direct an outgoing PDU specifying a source IP address. Each per-server routing table, e.g., server routing table 154(1)(M1+1) provides a set of possible interfaces to which an outgoing PDU may be directed. In some arrangements, a per-server routing table for a virtual server, e.g., 154(1)(M1+1) is generated by merging the per-IP routing tables 154(1)(1..M1) together.

The network stack 142 is also seen to include a routing table selector 146. The routing table selector 146 is configured to select a routing table based on source IP address or a connection mark associated with an outbound PDU. Again, such a selection is warranted in order to provide for network isolation of each virtual server 150(1), . . . , 150(N). In some arrangements, the routing table selector 156(1) takes the form of a rules table that maps source IP address or a connection mark associated with an outbound PDUs to a per-IP routing table or a per-server routing tables respectively Each virtual server, e.g., virtual server 150(1) has an IP address set 152(1..M1) and a connection mark 156(1). Typically, the connection mark 156(1) is generated for the virtual server 150(1) at its instantiation and identifies the virtual server 150(1) when an outbound PDU does not specify a source IP address.

Figure 2:
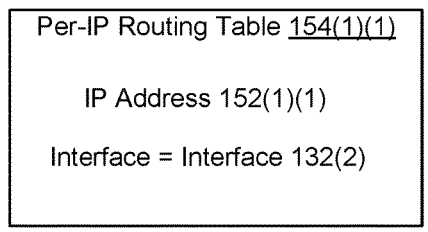
FIG. 2 is a block diagram illustrating an example per-IP routing table in the electronic environment of FIG. 1.

FIG. 2 shows details of a per-IP routing table 154(1)(1) for a server IP address 152(1)(1). The table 154(1)(1) contains routing rules associated with a server IP address 152(1)(1) of the set 152(1). That is, outbound PDUs identifying the IP address 152(1)(1) in the virtual server 150(1) as a source IP address will use the routing table 154(1)(1). The routing table 154(1)(1) further identifies a network interface, e.g., 132(2) to which outbound communications are sent on their way to a destination.

Figure 3:
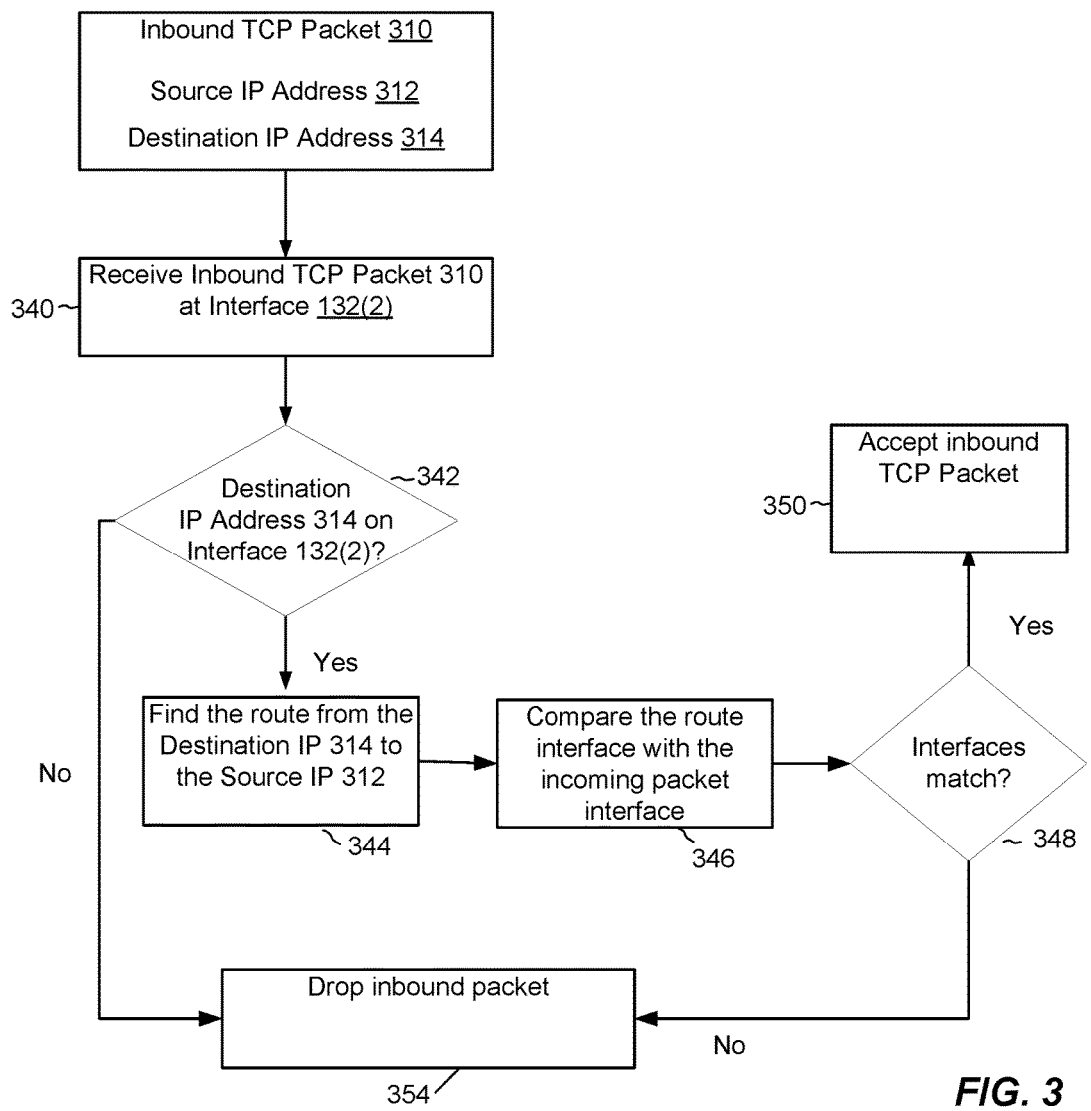
FIG. 3 is a flow chart illustrating an example inbound TCP packet reception in the electronic environment of FIG. 1.

One example operation is shown in FIG. 3 as process 300. In this example, a host 110(1) creates a TCP data packet 310 to be sent inbound to the SP 120. The source IP address 312 in the header of the packet 310 is the IP address of the host 110(1). The destination IP address 314 in the header of the packet 310 is an IP address of the set 152(1) in the virtual server 150(1) of the SP 120. For example, the TCP packet 310 may be a request to read data stored in the storage device 180.

At 340, the SP 120 receives the inbound TCP packet 310 specifying a source IP address 312 and a destination IP address 314 at the communications interface 132(2). Specifically, the host 110(1) sends the TCP packet 310 to the gateway 118(1) according to its routing table. The gateway 118(1) in turn sends the packet 310 along a path to another gateway according to its routing table, and so on, until the TCP packet 310 reaches the interface 132(2). The packet 310 arrives at the interface 132(2) because the interface 132(2) is specified by the gateway 118(1) by a previous arrangement, e.g., upon registration by the SP 120 with an administrator.

At 342, the SP 120 determines whether the destination IP address 314 is also specified by the interface 132(2). If not, then at 354 the SP 120 drops the inbound TCP packet 310. In some arrangements, the SP 120 may arrange for an error message to be sent to the host 110(1).

If so, then at 344, the routing table selector 156(1) locates the routing table 154(1)(1) identified by the destination IP address 314.

At 346, the network stack 142 reads the identifier of the interface in the routing table 154(1)(1) and compares this identifier with an identifier of the interface 132(2) at which the inbound TCP packet 310 was received. For example, the identifier of the interface 132(2) may take the form of an IPv4 address within a subnet local to the SP 120.

At 348, the network stack 142 verifies whether or not the interface identifiers match. If they do not match, then at 354, the network stack 142 drops the TCP packet 310 and the process 300 terminates. In some arrangements, the network stack 142 may arrange for an error message to be sent to the host 110(1). However, if there is a match, then at 350, the virtual server 150(1) accepts the inbound TCP packet 310.

Figure 4:
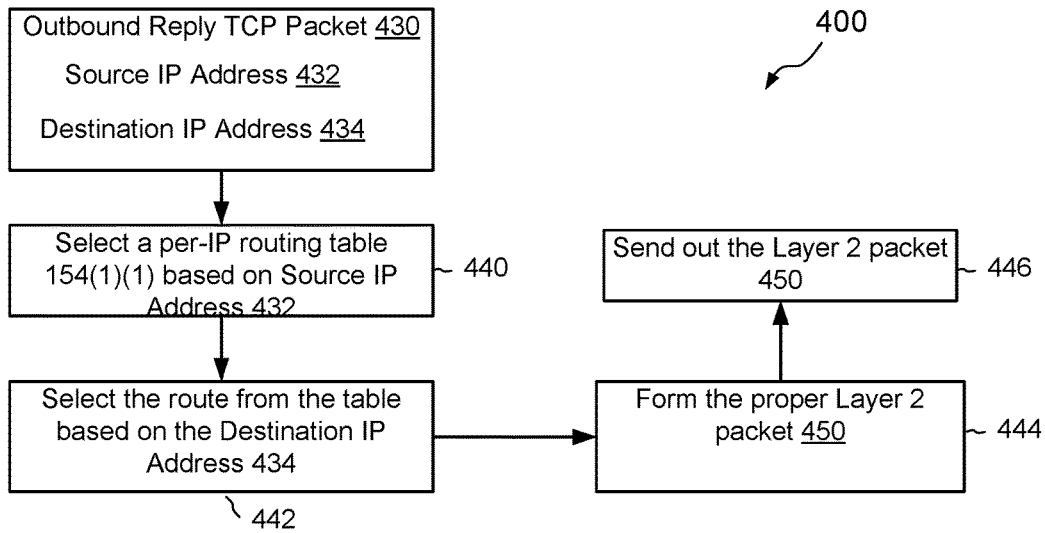
FIG. 4 is a flow chart illustrating an example outbound TCP packet generation and direction in the electronic environment of FIG. 1.

An example operation involving the generation and transmission of an outbound TCP packet 430 is shown in FIG. 4 as process 400. Here, in addition to a destination IP address 434, a source IP address 432 is provided to the header of the outbound packet 430.

In process 400, at 440, the SP 120 selects a per-IP routing table, e.g., 154(1)(1) based on the source IP address 432 of the outbound packet 430. For example, if the per-IP routing table 154(1)(1) is identified by an IP address, e.g., 152(1), then the network stack 142 matches the source IP address 432 with that IP address 152(1) and locates the table 154(1)(1) by the identification.

At 442, once the table 154(1)(1) is selected, the network stack 142 selects the route, i.e., the interface 132 by which the packet 430 will leave the server computer 120 based on the destination IP address 434 of the outbound packet 430.

At 444, once the route has been determined, the SP 120 generates a Layer 2 packet 450 satisfying the routing criterion.

At 446, 132(2), sends the layer 2 packet 450 onto its destination.

Figure 5:
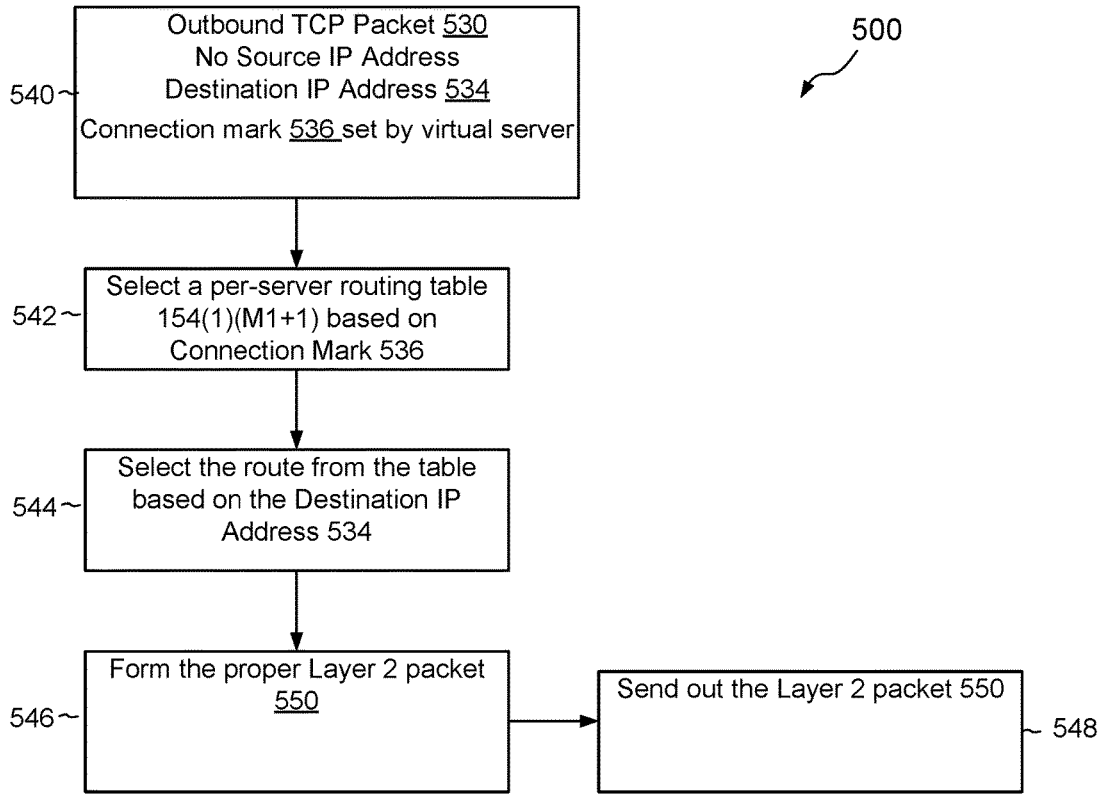
FIG. 5 is a flow chart illustrating another example outbound TCP packet generation and direction in the electronic environment of FIG. 1.

FIG. 5 shows a process 500 of routing an outbound TCP packet 530. At 540, the virtual server 150(1) creates the contents of TCP packet 530. The TCP packet 530 is to be sent outbound to the host 110(1). In this case, the virtual server 150(1) only specifies a destination IP address 534 and a connection mark 536; it does not specify a source IP address.

At 542, the network stack 142 selects a per-server routing table, e.g., table 154(1)(M1+1) based on the connection mark 536. For example, the network stack 142 references the connection mark 536 in the routing table selector 146 and then maps the connection mark 536 to a server-based routing table 154(1)(M1+1).

At 544, once the table 154(1)(1) is selected, the network stack 142 selects the route, i.e., the interface 132 by which the packet 530 will leave the server computer 120 based on the destination IP address 534 of the outbound packet 530.

At 546, once the route has been determined, the SP 120 generates a Layer 2 packet 550 that specifies the route.

At 548, 132(2), sends the layer 2 packet 550 onto its destination.

Figure 6:
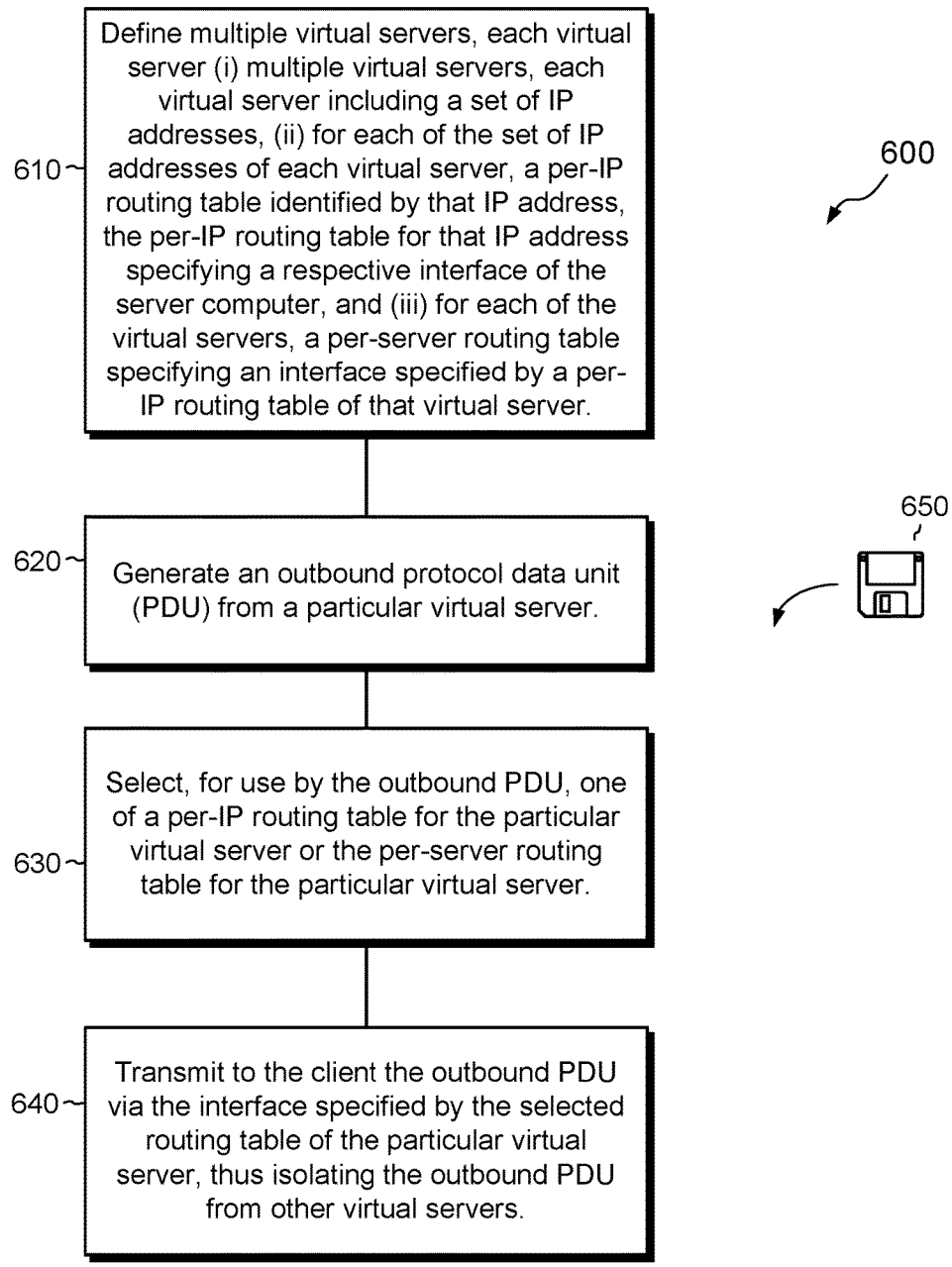
FIG. 6 is a flow chart illustrating a method of carrying out the improved technique in the electronic environment of FIG. 1.

FIG. 6 shows a method 600 of routing network traffic within a server computer. The method 600 may be performed by the software constructs described in connection with FIG. 1, which reside in the memory 130 of the SP 120 and are run by the processing units 124.

At 610, the processing circuitry of the server computer defines (i) multiple virtual servers, each virtual server including a set of IP addresses, (ii) for each of the set of IP addresses of each virtual server, a per-IP routing table identified by that IP address, the per-IP routing table for that IP address specifying a respective interface of the server computer, and (iii) for each of the virtual servers, a per-server routing table specifying interface(s) as specified by per-IP routing table(s) of that virtual server. Such generation is performed when registering the hosts 110(1), ..., 110(N) as part of a service level agreement, for example.

At 620, the processing circuitry generates an outbound protocol data unit (PDU) from a particular virtual server. The virtual server 150(1) may generate outbound PDUs as a reply to an inbound PDU or as a standalone PDU of its own.

At 630, the processing circuitry selects for use by the outbound PDU one of a per-IP routing table for the particular virtual server or the per-server routing table for the particular virtual server. In the case of a standalone PDU without the source IP specified, the network stack 142 matches a connection mark to a per-server routing table.

At 640, the processing circuitry transmits to the client the outbound PDU via the interface specified by the selected routing table of the particular virtual server, thus isolating the outbound PDU from other virtual servers.

Improved techniques for routing network traffic in a storage processor involve providing each IP address of a virtual server with its own Per-IP routing table specifying its own interface with a respective external network. The storage processor assigns each outbound PDU generated for use by a particular virtual server to a per-IP routing table provided for that virtual server. The storage processor identifies a per-IP routing table for a PDU based on the IP address of a virtual server in the storage processor from which the PDU is originated and which is provided in the PDU. Advantageously, the improved techniques allow the storage processor to isolate the virtual servers from each other.

Having described certain embodiments, numerous alternate embodiments or variations can be made. The examples, as mentioned above, involved TCP packets or PDUs, however other transport protocols may be used. One example is using UDP protocol in lieu of TCP and hence using UDP datagrams or PDUs in that context.

Also, the examples above considered the electronic environment being a data storage system. However, the above discussion involving isolating network traffic may involve any server that hosts multiple virtual servers. For example, the above discussion may apply to a multi-tenant server distributing traffic in a data center serving multiple customers.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of routing network traffic within a server computer, the method comprising:
    defining, by processing circuitry of the server computer, (i) multiple virtual servers, each virtual server including a set of IP addresses, (ii) for each of the set of IP addresses of each virtual server, a per-IP routing table identified by that IP address, the per-IP routing table for that IP address specifying a respective interface of the server computer, and (iii) for each of the virtual servers, a per-server routing table specifying an interface specified by a per-IP routing table of that virtual server;
    generating, by the processing circuitry, an outbound protocol data unit (PDU) from a particular virtual server;
    selecting, by the processing circuitry for use by the outbound PDU, one of a per-IP routing table for the particular virtual server or the per-server routing table for the particular virtual server; and
    transmitting to a client, by the processing circuitry, the outbound PDU via the interface specified by the selected routing table of the particular virtual server, thus isolating the outbound PDU from other virtual servers.

2. A method as in claim 1, wherein generating the outbound PDU includes specifying a source IP address of the outbound PDU, and
    wherein selecting one of a per-IP routing table for the particular virtual server or the per-server routing table for the particular virtual server includes selecting a per-IP routing table for the particular virtual server based on the source address.

3. A method as in claim 2, further comprising, prior to generating the outbound PDU, receiving an inbound PDU from the destination address at an interface of the server computer; and
    wherein the outbound PDU is generated from the particular virtual server as a reply to the inbound PDU.

4. A method as in claim 3, wherein the inbound PDU specifies a source IP address and a destination IP address;
    wherein the method further comprises:
    reading the source IP address and the destination IP address from the inbound PDU; and
    persisting the source IP address and the destination IP address in memory, and
    wherein generating the outbound PDU includes appending, as the source IP address of the outbound PDU, the destination IP address persisted in memory.

5. A method as in claim 3, further comprising, after receiving the inbound PDU from the destination IP address, verifying that the interface at which the inbound PDU specifies the destination IP address.

6. A method as in claim 5, further comprising, after verifying that the interface at which the inbound PDU specifies the destination IP address:

acquiring an interface identifier identifying an interface through which the inbound PDU was received by the server computer;

identifying (i) the particular virtual server based on the acquired interface identifier and (ii) a per-IP routing table of the virtual server based on the destination IP address read from the inbound PDU; and verifying that the interface specified in the per-IP routing table is the same as the interface identified by the acquired interface identifier.

7. A method as in claim 6, further comprising:

receiving a second inbound PDU from a second destination address at a second interface;

verifying that the second interface at which the second inbound PDU is received specifies the destination IP address;

acquiring an interface identifier identifying the second interface; identifying (i) the particular virtual server based on the acquired interface identifier and (ii) a per-IP routing table of the virtual server based on the destination IP address read from the inbound PDU; and verifying that the interface specified in the per-IP routing table is different from the interface identified by the acquired interface identifier; and dropping the second inbound PDU in response to the verification that the second interface specified in the second per-IP routing table is different from the interface identified by the acquired second interface identifier.

8. A method as in claim 3, wherein the server computer is a storage processor of a data storage system that provides storage space for data of multiple clients; and wherein the inbound PDU includes an 10 request from a client; and wherein the outbound PDU generated from the particular virtual server as a reply to the inbound PDU includes an acknowledgement of the 10 request.

9. A method as in claim 1, wherein each of the virtual servers includes a connection mark identifying that virtual server;

wherein generating the outbound PDU includes appending a connection mark to the PDU, the connection mark identifying the PDU with a virtual server; and wherein selecting one of a per-IP routing table for the particular virtual server or the per-server routing table for the particular virtual server includes selecting the per-server routing table based on the connection mark appended to the outbound PDU.

10. A method as in claim 9, further comprising selecting an interface of the server computer to which the outbound PDU is directed from the selected per-server routing table based on a destination IP address of the outbound PDU.

11. A computer program product including a non-transitory, computer-readable storage medium which stores executable code, which when executed by a server computer, causes the server computer to perform a method of routing network traffic within the server computer, the method comprising:

defining (i) multiple virtual servers, each virtual server including a set of IP addresses, (ii) for each of the set of IP addresses of each virtual server, a per-IP routing table identified by that IP address, the per-IP routing table for that IP address specifying a respective interface of the server computer, and (iii) for each of the virtual servers, a per-server routing table specifying an interface specified by a per-IP routing table of that virtual server;

generating an outbound protocol data unit (PDU) from a particular virtual server;

selecting, for use by the outbound PDU, one of a per-IP routing table for the particular virtual server or the per-server routing table for the particular virtual server; and transmitting the outbound PDU to a client via the interface specified by the selected routing table of the particular virtual server, thus isolating the outbound PDU from other virtual servers.

12. A computer program product as in claim 11, wherein generating the outbound PDU includes specifying a source IP address of the outbound PDU, and wherein selecting one of a per-IP routing table for the particular virtual server or the per-server routing table for the particular virtual server includes selecting a per-IP routing table for the particular virtual server based on the source address.

13. A computer program product as in claim 12, wherein the method further comprises, prior to generating the outbound PDU, receiving an inbound PDU from the destination address at an interface of the server computer;

and wherein the outbound PDU is generated from the particular virtual server as a reply to the inbound PDU.

14. A computer program product as in claim 13, wherein the inbound PDU specifies a source IP address and a destination IP address;

wherein the method further comprises:

reading the source IP address and the destination IP address from the inbound PDU; and persisting the source IP address and the destination IP address in memory, and wherein generating the outbound PDU includes appending, as the source IP address of the outbound PDU, the destination IP address persisted in memory.

15. A computer program product as in claim 13, wherein the method further comprises, after receiving the inbound PDU from the destination IP address, verifying that the interface at which the inbound PDU specifies the destination IP address.

16. A computer program product as in claim 15, wherein the method further comprises, after verifying that the interface at which the inbound PDU specifies the destination IP address:

acquiring an interface identifier identifying an interface through which the inbound PDU was received by the server computer;

identifying (i) the particular virtual server based on the acquired interface identifier and (ii) a per-IP routing table of the virtual server based on the destination IP address read from the inbound PDU; and verifying that the interface specified in the per-IP routing table is the same as the interface identified by the acquired interface identifier.

17. A computer program product as in claim 16, further comprising:

receiving a second inbound PDU from a second destination address at a second interface;

verifying that the second interface at which the second inbound PDU is received specifies the destination IP address;

acquiring an interface identifier identifying the second interface; identifying (i) the particular virtual server based on the acquired interface identifier and (ii) a per-IP routing table of the virtual server based on the destination IP address read from the inbound PDU; and verifying that the interface specified in the per-IP routing table is different from the interface identified by the acquired interface identifier; and dropping the second inbound PDU in response to the verification that the second interface specified in the second per-IP routing table is different from the interface identified by the acquired second interface identifier.

18. A computer program product as in claim 13, wherein the server computer is a storage processor of a data storage system that provides storage space for data of multiple clients; and wherein the inbound PDU includes an IO request from a client; and wherein the outbound PDU generated from the particular virtual server as a reply to the inbound PDU includes an acknowledgement of the IO request.

19. A computer program product as in claim 11, wherein each of the virtual servers includes a connection mark identifying that virtual server;

wherein generating the outbound PDU includes appending a connection mark to the PDU, the connection mark identifying the PDU with a virtual server; and wherein selecting one of a per-IP routing table for the particular virtual server or the per-server routing table for the particular virtual server includes selecting the per-server routing table based on the connection mark appended to the outbound PDU.

20. An electronic apparatus constructed and arranged to route network traffic within the electronic apparatus, the electronic apparatus including: a network interface; memory; and controlling circuitry couple to the memory, the controlling circuitry being constructed and arranged to:

define (i) multiple virtual servers, each virtual server including a set of IP addresses, (ii) for each of the set of IP addresses of each virtual server, a per-IP routing table identified by that IP address, the per-IP routing table for that IP address specifying a respective interface of the server computer, and (iii) for each of the virtual servers, a per-server routing table specifying an interface specified by a per-IP routing tables of that virtual server;

generate an outbound protocol data unit (PDU) from a particular virtual server;

select, for use by the outbound PDU, one of a per-IP routing table for the particular virtual server or the per-server routing table for the particular virtual server; and transmit the outbound PDU to a client via the interface specified by the selected routing table of the particular virtual server, thus isolating the outbound PDU from other virtual servers.

* * * * *